United States Patent
Taya (10) Patent No.: US 10,042,062 B2
(45) Date of Patent: Aug. 7, 2018

(54) EARTHQUAKE PREDICTION DEVICE

(71) Applicant: CENTRAL JAPAN RAILWAY COMPANY, Aichi (JP)

(72) Inventor: Shuichi Taya, Aichi (JP)

(73) Assignee: CENTRAL JAPAN RAILWAY COMPANY, Aichi (JP)

(*) Notice: Subject to any disclaimer, the term of this patent is extended or adjusted under 35 U.S.C. 154(b) by 212 days.

(21) Appl. No.: 14/770,430

(22) PCT Filed: Feb. 25, 2013

(86) PCT No.: PCT/JP2013/054759
§ 371 (c)(1),
(2) Date: Aug. 25, 2015

(87) PCT Pub. No.: WO2014/128965
PCT Pub. Date: Aug. 28, 2014

(65) Prior Publication Data
US 2015/0378036 A1    Dec. 31, 2015

(51) Int. Cl.
*G01V 1/00* (2006.01)
*G01V 1/28* (2006.01)

(52) U.S. Cl.
CPC ...... *G01V 1/008* (2013.01); *G01V 2210/1232* (2013.01)

(58) Field of Classification Search
CPC . G01V 1/008; G01V 1/22; G01V 1/28; G01V 1/288
See application file for complete search history.

(56) References Cited

U.S. PATENT DOCUMENTS

| 5,597,188 A | 1/1997 | Miche |
| 5,625,348 A * | 4/1997 | Farnsworth ............ G01V 1/008 324/323 |
| 2012/0274440 A1 | 11/2012 | Meadows et al. |

FOREIGN PATENT DOCUMENTS

| JP | 2009-080046 | 4/2009 |
| JP | 2009068899 | * 4/2009 |
| JP | 2009068899 A | 4/2009 |
| JP | 2011-002371 A | 6/2009 |
| JP | 2009-264864 | 11/2009 |
| JP | 4472769 B2 | 6/2010 |
| JP | 2012-078879 | 4/2012 |

OTHER PUBLICATIONS

Office Action from corresponding Chinese Patent Appl. No. 201380073783X, dated Nov. 4, 2016.
(Continued)

*Primary Examiner* — Kretelia Graham
(74) *Attorney, Agent, or Firm* — Koppel, Patrick, Heybl & Philpott (57) ABSTRACT

An earthquake prediction device comprises a predicted value calculation unit 16 that calculates, from a prediction formula below, a predicted value (MMIap) indicating a predicted intensity of a ground motion on the Modified Mercalli Intensity scale, using a maximum acceleration value (Aumax), which is a maximum absolute value among absolute values of vertical acceleration component of the ground motion, after a sensor starts detecting the ground motion caused by an earthquake. The prediction formula is: MMIap=$\alpha$a log$_{10}$(Aumax)+$\beta$a.

3 Claims, 9 Drawing Sheets

(56) References Cited

OTHER PUBLICATIONS

Notification of Transmittal of Translation of the International Preliminary Report on Patentability from Application No. PCT/JP2013/054759, dated Aug. 27, 2015.
Extended European Search Report from European Patent Appl. No. 13875920.4-1559, dated Sep. 13, 2016.
Taiwanese Examination Report from Appl. No. 102106486, dated Aug. 10, 2016.
M.D. Trifunac. et al., "A note on scaling peak acceleration, velocity and displacement of strong earthquake shaking by Modified Mercalli Intensity (MMI) and site soil and geologic conditions", Soil Dynamics and Earchquake Engineering, vol. 11, No. 2, Jan. 1, 1992 (Jan. 1, 1992), pp. 101-110, XP055298898, Amsterdam, NL, ISSN: 0267-7261, DOI: 10.1016/0267-7261(92)90048-I figures 2.5 , tables lb, 2.
G-A. Tselentis. et al., "Empirical Relationships between Modified Mercalli Intensity and Engineering Ground-Motion Parameters in Greece", Seismological Society of America, Bulletin. vol. 98, No. 4, Aug. 1, 2008 (Aug. 1, 2008). pp. 1863-1875, XP055298895, US, ISSN: 0037-1106, DOI: 10.1785/0120070172 Sections "Data Set" and "Empirical Relationships".
L. Linkimer, "Relationship Between Peak Ground Acceleration and Modified Mercalli Intensity in Costa Rica" Revista Geologica De America Central. No. 38, Jan. 1, 2008 (Jan. 1, 2008), XP055299009, ISSN: 0256-7024, DOI: 10.15517/rgac.v0i38.4218 p. 91, col. 2, lines 7-26.
International Search Report (PCT/ISA/210) PCT/JP2013/054759 dated Apr. 16, 2013.
"Relationships between Peak Ground Acceleration, Peak Ground Velocity, and Modified Mercalli Intensity in California" David J. Wald, Vincent Quitoriano, Thomas H. Heaton, and Hiroo Kanamori, Earthquake Spectra, vol. 15, No. 3, Aug. 1999.
"Examination of Rational Ground Motion Index Value- Relationship between Ground Motion Indices based on DI Value" Yutaka Nakamura, 2003, Collection of Earthquake Engineering Papers by Japan Society of Civil Engineers.
"Relations of USGS MM Intensity Versus Earthquake Ground Motion Indices Using the Three Recent California Earthquakes", Japan Society of Civil Engineers Dai 55 Kai Nemi Gakujutsu Koenkai Koen Galyosho.
Form PCT/IPEA/409 for PCT/JP2013/054759 dated May 12, 2015 (in Japanese).
Second Office Action from corresponding Chinese Patent Appl. No. 201380073783X, dated May 19, 2017.
Notice of Reasons for Rejection from corresponding Japanese Patent Appl. No. 2015-501228, dated Mar. 14, 2017.
Notice of Reasons for Rejection from corresponding Japanese Patent Appl. No. 2015-501288, dated Mar. 14, 2017.

* cited by examiner

|  | | MMIap | MMIa | |
|---|---|---|---|---|
| | | | 5.5 OR LARGER | SMALLER THAN 5.5 |
| MMIap | 5.5 OR LARGER | MMIap REACHED 5.5 EARLIER | 384 | 40 |
| | | MMIa REACHED 5.5 EARLIER | 66 | |
| | SMALLER THAN 5.5 | | 64 | 1769 |
| TOTAL | | | 514 | 1809 |
| | | | 2323 | |

EARTHQUAKE PREDICTION DEVICE

TECHNICAL FIELD

The present invention relates to an earthquake prediction device that predicts an intensity of earthquake shaking at the time of initial tremor of the ground motion, using the Modified Mercalli Intensity scale as a ground motion index indicating the intensity of earthquake shaking.

BACKGROUND ART

Presently, a device is known that measures the intensity of earthquake shaking in real time (Patent Document 1).

This device detects acceleration components of the ground motion in three directions (vertical, east-west, and north-south), calculates an acceleration by vector-synthesizing these acceleration components, and calculates an index value indicating the intensity of earthquake shaking from this acceleration, to thereby measure the intensity of earthquake shaking in real time.

In addition, presently, a device is also known that predicts the intensity of earthquake shaking at the time of initial tremor of the ground motion (Patent Document 2).

Among the above-described acceleration components of the ground motion in the three directions, the vertical acceleration component has properties of increasing in value earlier than the other acceleration components.

Thus, this device predicts the intensity of earthquake shaking by detecting the vertical acceleration component of the ground motion and calculating the index value indicating the intensity of earthquake shaking corresponding to this acceleration component.

In the meantime, the inventions set forth in the above-described Patent Documents 1 and 2 have been created in Japan, and thus, a seismic intensity scale defined by the Japan Meteorological Agency is adopted as the ground motion index in the both inventions.

However, the Modified Mercalli Intensity (MMI) scale is internationally used as the ground motion index, and thus, the devices set forth in the above-described Patent Documents 1 and 2 cannot be used abroad as they are.

Therefore, when the respective devices set forth in the above-described Patent Documents 1 and 2 are used abroad, it is one option to replace, as the ground motion index, the seismic intensity scale defined by the Japan Meteorological Agency with the MMI scale. However, the MMI scale is a ground motion index determined on the basis of human bodily sensation or investigations of the damage situation after the earthquake, and thus, the MMI scale is hardly suited to instrumental measurement, and such replacement is not easy.

Nevertheless, some proposals for using the MMI scale in instrumental measurement have been made.

For example, Wald et al. have proposed a method for estimating the index value on the MMI scale from the acceleration or the velocity of the ground motion (Non-patent Document 1) and, in Japan too, Nakamura has proposed a method for actually measuring the intensity of earthquake shaking using the MMI scale as the ground motion index (Non-patent Document 2).

PRIOR ART DOCUMENTS

Patent Documents

Patent Document 1: Publication of Japanese Patent No. 4472769

Patent Document 2: Japanese Unexamined Patent Application Publication No. 2009-068899

Non-Patent Documents

Non-patent Document 1: "Relationships between Peak Ground Acceleration, Peak Ground Velocity, and Modified Mercalli Intensity in California" David J. Wald, Vincent Quitoriano, Thomas H. Heaton, and Hiroo Kanamori, Earthquake Spectra, Vol. 15, No. 3, August 1999

Non-patent Document 2: "Examination of Rational Ground Motion Index Value—Relationship between Ground Motion Indices based on DI Value" Yutaka Nakamura, 2003, Collection of Earthquake Engineering Papers by Japan Society of Civil Engineers

SUMMARY OF THE INVENTION

Problems to be Solved by the Invention

However, none of the proposals have yet led to prediction of the intensity of earthquake shaking, although the MMI scale is used as the ground motion index in the proposals.

Thus, in an earthquake prediction device according to one aspect of the present invention, the MMI scale is used as the ground motion index, and the intensity of earthquake shaking is predicted early at the time of initial tremor of the ground motion.

Means for Solving the Problems

An earthquake prediction device according to a first aspect of the present invention comprises a vertical acceleration acquisition unit (10, S10) and a predicted value calculation unit (16, S12).

The vertical acceleration acquisition unit (10, S10) sequentially acquires vertical acceleration information indicating a vertical acceleration component of a ground motion from a sensor that detects the ground motion, when the sensor starts detecting the ground motion.

The predicted value calculation unit (16, S12) calculates a predicted value (MMIap) indicating an intensity of earthquake shaking by an index value on the Modified Mercalli Intensity scale, using a maximum absolute value among absolute values of vertical acceleration component of the ground motion indicated by the vertical acceleration information sequentially acquired by the vertical acceleration acquisition unit as a maximum acceleration value (Aumax), using a prediction formula below.

The prediction formula is: $MMIap = \alpha a \log_{10}(Aumax) + \beta a$.

In the formula, $\alpha a$ and $\beta a$ are regression coefficients calculated in advance by regression analysis using a maximum absolute value among absolute values of vertical acceleration component of the ground motion of each of a plurality of earthquakes that occurred in the past as an explanatory variable (X) and using an index value indicating each intensity of earthquake shaking on the Modified Mercalli Intensity scale as a dependent variable (Y).

For example, when the regression analysis is performed using the K-NET as a database in which the earthquakes that occurred in the past are recorded (see FIG. 2), the result is $Y = 3.56 \log_{10} X - 0.07$. Thus, in the above prediction formula, $\alpha a$ may be set at 3.56, and $\beta a$ may be set at −0.07.

According to a proposal in Non-patent Document 1 by Wald et al., when a maximum absolute value among absolute values of accelerations of the ground motion is referred to as Amax, a calculated value (MMIa) indicating an intensity of the earthquake shaking on the Modified Mercalli Intensity scale can be obtained by using a calculation formula below.

The calculation formula: MMIa=$\alpha \log_{10}($Amax$)\alpha\beta$

In this calculation formula, $\alpha$ is 3.66, and $\beta$ is −1.66.

When the predicted value (MMIap) and the calculated value (MMIa) respectively derived from the prediction formula and the calculation formula are compared with each other, it has been found that, at the time of initial tremor of the earthquake, the predicted value (MMIap) increases earlier than the calculated value (MMIa).

Accordingly, with the earthquake prediction device of the present invention, the intensity of earthquake shaking can be predicted early at the time of initial tremor of the earthquake by using the MMI scale as the ground motion index.

Moreover, in the earthquake prediction device of the present invention, prediction of an earthquake that is easy to understand globally is possible because the MMI scale is used as the ground motion index.

Next, in the earthquake prediction device according to a second aspect of the present invention, in addition to the configuration of the earthquake prediction device according to the first aspect, an adjustment factor setting unit (22) that adjusts an adjustment factor ($\gamma$a) may be provided, and a prediction formula below, in which the adjustment factor ($\gamma$a) is added, may be used as a prediction formula.

The prediction formula is: MMIap=$\alpha$a $\log_{10}($Aumax$)+\beta$a+$\gamma$a.

When the intensity of earthquake shaking is predicted and a warning thereabout is issued using the earthquake prediction device of the present invention, following two demands from users are expected, for example.

One demand expected is that a warning be issued in every case when occurrence of an earthquake causing a destructive shaking that requires caution is predicted even if there are some cases in which the prediction turns out to be incorrect, regardless of whether an earthquake causing a destructive shaking that requires caution is actually occurring. In this case, increase in the warning success rate is desired.

The other demand expected is that a warning not be issued when an earthquake causing a destructive shaking that requires caution is not occurring even if there are some cases in which no warning is issued when an earthquake causing a destructive shaking that requires caution is occurring. In this case, decrease in a cry-wolf false warning rate is desired. Here, a cry-wolf false warning means a too sensitive warning issued for a minor shaking.

Thus, in the earthquake prediction device of the present invention, the predicted value (MMIap) to be calculated is adjusted by adding $\gamma$a in the prediction formula, and the above two demands can thereby be met.

Figure 7:
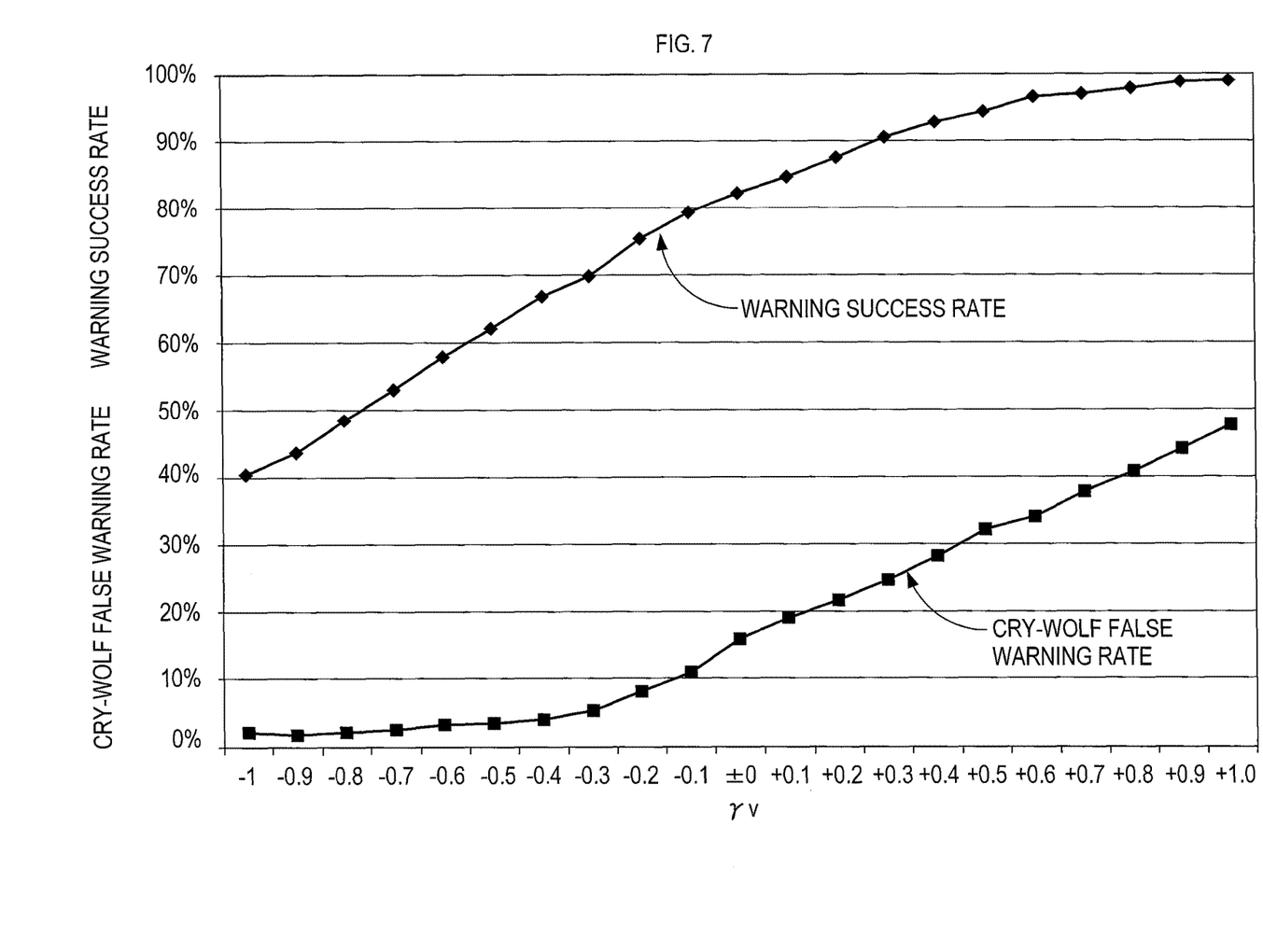
FIG. 7 is a graph showing a state in which a warning success rate and a cry-wolf false warning rate change when an adjustment factor ($\gamma$a) is adjusted.

For example, when a warning reference value is set at level 5.5 on the MMI scale and $\gamma$a is set at −1, the cry-wolf false warning rate is closer to 0%, and in contrast, when $\gamma$a is set at 1, the warning success rate is closer to 100%, as shown in FIG. 7.

That is, when $\gamma$a is set at 1, if occurrence of an earthquake causing a destructive shaking that requires caution is predicted, a warning is issued without exception regardless of whether the earthquake causing a destructive shaking that requires caution is actually occurring.

On the other hand, when $\gamma$a is set at −1, there are some cases in which no warning is issued when an earthquake causing a destructive shaking that requires caution is occurring, whereas no case arises in which a warning is issued when an earthquake causing a destructive shaking that requires caution is not occurring.

Consequently, with the earthquake prediction device of the present invention, a prediction that meets the users' demands is enabled in addition to the effects of the earthquake prediction device according to the first aspect.

Next, in the earthquake prediction device according to a third aspect of the present invention, a warning unit (18, S22-S24) may be provided that compares the predicted value (MMIap) calculated by the predicted value calculation unit and the warning reference value set in advance with each other and issues a warning when the predicted value (MMIap) is larger than the warning reference value.

In this earthquake prediction device, the warning is issued only when the predicted value (MMIap) is larger than the warning reference value set in advance, and thus, a useless warning issued when an earthquake that does not require a warning is occurring can be inhibited.

In the earthquake prediction device according to a fourth aspect of the present invention, an earthquake occurrence determination unit (20) that determines occurrence of an earthquake by presence/absence of the ground motion may be provided, and the warning unit may issue the warning when the earthquake occurrence determination unit determines that the earthquake is occurring.

For information, reference numerals in parentheses after the above units, etc., are each one example indicating corresponding relationships with functional blocks, etc., set forth in embodiments to be described later, and the present invention is not limited to the functional blocks, etc., indicated by the reference numerals in the parentheses after the above respective units.

EXPLANATION OF REFERENCE NUMERALS

1 . . . earthquake prediction device, 3 . . . acceleration sensor device, 5 . . . external warning device, 10 . . . acceleration acquisition unit, 14 . . . acceleration recording unit, 16 . . . predicted value calculation unit, 18 . . . first warning unit, 20 . . . earthquake occurrence determination unit, 20a . . . flag storage region, 22 . . . adjustment factor setting unit, 24 . . . general earthquake determination unit, 26 . . . second warning unit, 30 . . . vertical acceleration sensor, 32 . . . east-west acceleration sensor, 34 . . . north-south acceleration sensor

MODE FOR CARRYING OUT THE INVENTION

Embodiments of the present invention will be explained below with reference to the drawings.

First Embodiment

1. Earthquake Prediction Device 1

An earthquake prediction device 1 of a first embodiment will be explained with reference to FIG. 1. It is to be noted that the first embodiment will be referred to as the present embodiment in the sections below in which the first embodiment is explained.

The earthquake prediction device 1 of the present embodiment is a computer device including a CPU, a ROM 1a, a RAM, and so on. The CPU and the RAM are not illustrated in FIG. 1.

Connected to the earthquake prediction device 1 are an acceleration sensor device 3 and an external warning device 5.

Among these, the acceleration sensor device 3 comprises three acceleration sensors (a vertical acceleration sensor 30, an east-west acceleration sensor 32, and a north-south acceleration sensor 34) that detect a ground motion as acceleration components in three directions (vertical, east-west, and north-south) orthogonal to each other.

In the present embodiment, observation points are set up in a dispersed manner at areas where occurrence of an earthquake is expected, and the earthquake prediction device 1 and the acceleration sensor device 3 are placed at each of the observation points.

When a seismic wave arrives at the observation points, the respective sensors 30 to 34 each start detecting the corresponding acceleration component of the ground motion at each observation point, and the acceleration sensor device 3 starts outputting analog signals indicating the respective acceleration components.

The external warning device 5 is placed in a place apart from the respective observation points, and is connected to a plurality of the earthquake prediction devices 1 placed at the respective observation points, so as to be able to communicate with them via public lines.

Upon receipt of a warning signal from any of the earthquake prediction devices 1, the external warning device 5 performs a warning action such as output of a warning sound and display of warning information.

Further, if the external warning device 5 works in conjunction with, for example, a train control device, upon receipt of the warning signal, the external warning device 5 performs a warning action to instruct the train control device to stop trains.

Figure 1:
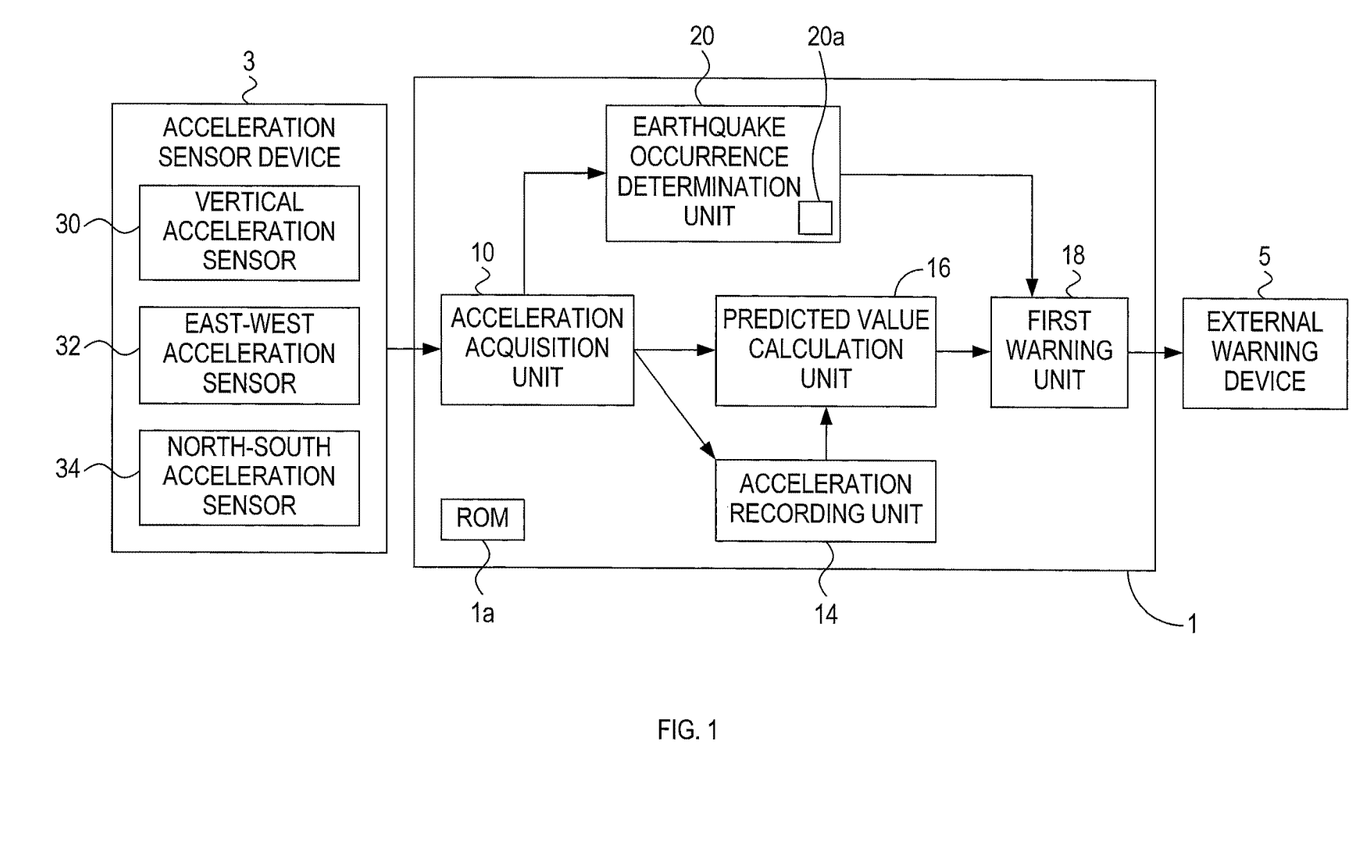
FIG. 1 is a block diagram showing, with blocks, various functions of an earthquake prediction device of a first embodiment.

As shown in FIG. 1, the earthquake prediction device 1 comprises an acceleration acquisition unit 10, an acceleration recording unit 14, a predicted value calculation unit 16, a first warning unit 18, and an earthquake occurrence determination unit 20.

Functions of these respective units 10 to 20 are fulfilled by the earthquake prediction device 1's execution of an earthquake warning process A stored in the ROM 1a, which will be described later.

The acceleration acquisition unit 10 sequentially inputs the analog signals indicating the acceleration components in the three directions (vertical, east-west, and north-south) outputted when the respective sensors 30 to 34 in the acceleration sensor device 3 detect the ground motion, and samples these analog signals in each sampling period set in advance.

Then, the acceleration acquisition unit 10 sequentially outputs digital signal generated by sampling the analog signal indicating the vertical acceleration component of the ground motion to the acceleration recording unit 14 and the earthquake occurrence determination unit 20.

Further, the acceleration acquisition unit 10 sequentially outputs digital signals generated by sampling the analog signals indicating the acceleration component in the east-west direction and the acceleration component in the north-south direction to the earthquake occurrence determination unit 20.

In the present embodiment, the sampling period is set at 100 Hz, but is not limited to this. (A configuration may be adopted in which the acceleration acquisition unit 10 is arranged in the acceleration sensor device 3 and the digital signals are transmitted from the acceleration sensor device 3 to the earthquake prediction device 1.)

Each time the acceleration recording unit 14 inputs the digital signal from the acceleration acquisition unit 10, the acceleration recording unit 14 executes a process for sequentially storing information indicated by the digital signal.

The information indicated by the digital signal is vertical acceleration information indicating the vertical acceleration component of the ground motion inputted as the analog signal from the acceleration sensor device 3.

Each time the digital signal is outputted from the acceleration acquisition unit 10, the predicted value calculation unit 16 sequentially calculates, on the basis of a prediction formula, which will be described later, a predicted value (MMIap) indicating the intensity of earthquake shaking on the MMI scale, using a maximum acceleration value (Aumax), which is a maximum absolute value among absolute values of the vertical acceleration component in the vertical acceleration information recorded in the acceleration recording unit 14.

When the earthquake occurrence determination unit 20 determines that an earthquake is occurring, the first warning unit 18 outputs the warning signal to the external warning device 5 if the predicted value (MMIap) calculated by the predicted value calculation unit 16 is determined to be larger than a warning reference value (level 5.5 on the MMI scale) set in advance.

The earthquake occurrence determination unit 20 comprises a flag storage region 20a in which flag information used in the earthquake warning process A (see FIG. 6) to be described later is stored. The flag information indicates whether a ground motion has been detected at the observation point, i.e., whether an earthquake is occurring now.

Each time the earthquake occurrence determination unit 20 inputs the digital signals indicating the acceleration components of the ground motion in the orthogonal three directions from the acceleration acquisition unit 10 in each sampling period, the earthquake occurrence determination unit 20 calculates the absolute value of the acceleration obtained by vector-synthesizing these acceleration components in the three directions.

Then, if the absolute value of this acceleration is larger than an earthquake occurrence reference value set in advance in order to determine whether an earthquake is occurring, the earthquake occurrence determination unit 20 executes a process for setting the flag information stored in the flag storage region 20a at "1".

In contrast, if the absolute value of this acceleration is equal to or smaller than the earthquake occurrence reference value, the earthquake occurrence determination unit 20 executes a process for setting the flag information stored in the flag storage region 20a at "0".

Then, the earthquake occurrence determination unit 20 outputs the flag information stored in the flag storage region 20a to the first warning unit 18.

2. Regarding Method of Calculating MMIap

Next, an explanation will be given of the prediction formula below used in the present embodiment.

The prediction formula: $MMIap = \alpha a \log_{10}(Aumax) + \beta a$

This prediction formula is used to obtain the predicted value (MMIap) indicating the intensity of earthquake shaking with an index value on the Modified Mercalli Intensity scale.

Aumax is the maximum absolute value among the absolute values of the vertical acceleration component of the ground motion stored in the acceleration recording unit 14.

As described above, when the vertical acceleration sensor 30 starts detecting the ground motion, the sampled vertical acceleration information indicating the vertical acceleration component of the ground motion is sequentially stored in the acceleration recording unit 14.

When calculating the predicted value (MMIap) using the above prediction formula, the predicted value calculation unit 16 acquires the maximum acceleration value (Aumax) from the acceleration recording unit 14.

On the other hand, $\alpha a$ and $\beta a$ are coefficient values calculated in advance using waveform data recorded by the K-NET, which is a database of a seismic observation network operated by the National Research Institute for Earth Science and Disaster Prevention.

Regarding 2323 waveform data recorded by the K-NET at 13 earthquakes that occurred in the past, a maximum absolute value (gal) of a vertical acceleration component and an index value on the MMI scale for each recorded waveform are obtained, and they are plotted on a semilogarithmic graph with the horizontal axis denoting the maximum value and with the vertical axis denoting the index value. As a result, a relationship as shown in FIG. 2 is obtained.

Figure 2:
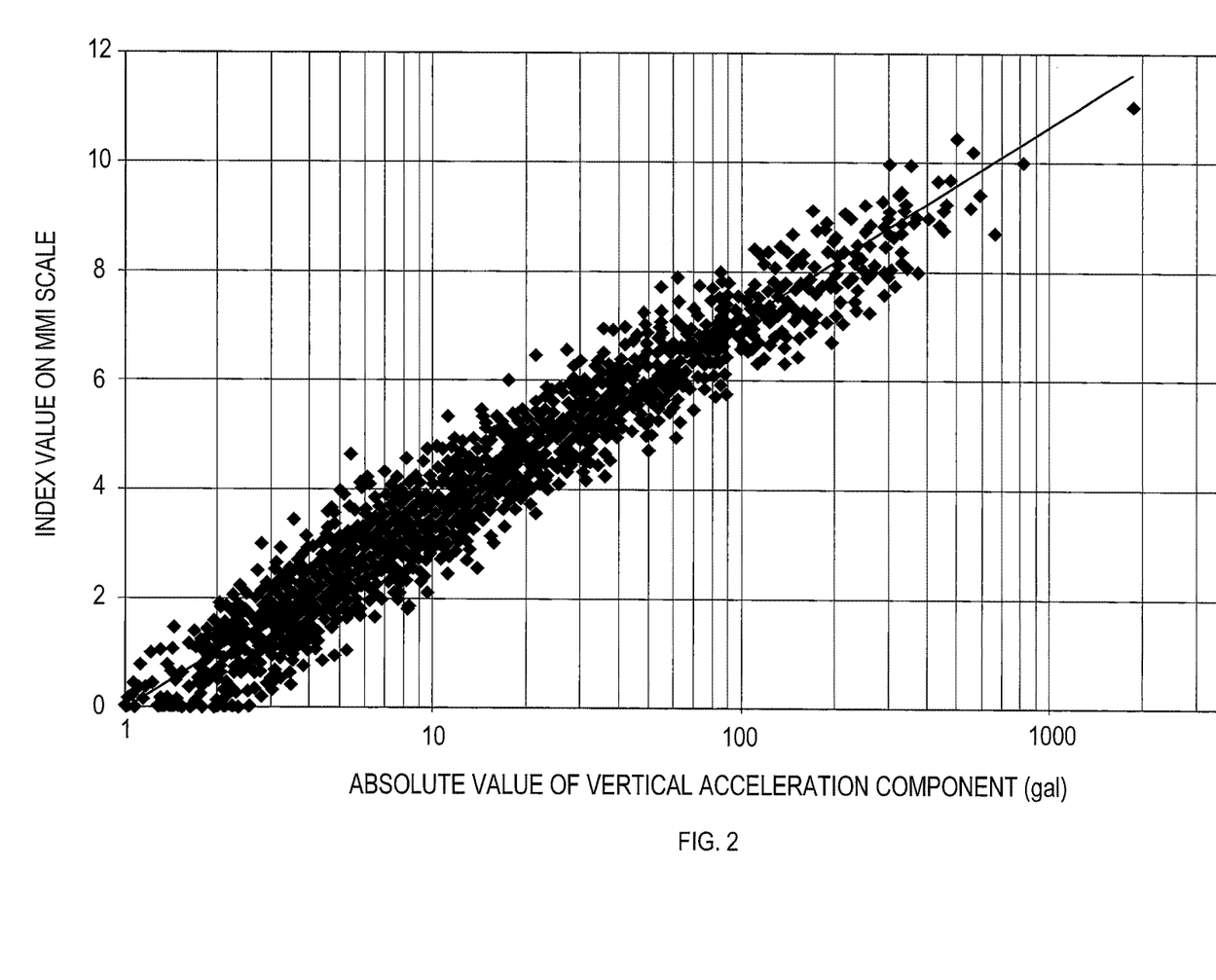
FIG. 2 is an exponential graph, with the horizontal axis denoting an acceleration (unit: gal) and with the vertical axis denoting an index value on the MMI scale, on which a maximum absolute value among absolute values of vertical acceleration component of a ground motion of each earthquake that occurred in the past is plotted as an abscissa and an index value indicating each intensity of earthquake shaking on the MMI scale is plotted as an ordinate.

$\alpha a$ and $\beta a$ are calculated as regression coefficients by regression analysis using the maximum absolute value of the vertical acceleration component in FIG. 2 as an explanatory variable (X) and using the index value on the MMI scale in FIG. 2 as a dependent variable (Y).

When the regression analysis is performed using the data of the ground motions of the earthquakes recorded by the K-NET, the result is $Y = 3.56 \log_{10} X - 0.07$, and thus, $\alpha a$ in the above prediction formula is set at 3.56, and $\beta a$ is set at $-0.07$.

It is to be noted that, in order to indicate each intensity of earthquake shaking with the index value on the MMI scale, a calculation formula proposed in Non-patent Document 1 by Wald et al. is used for calculation of the index value (hereinafter referred to as a "calculated value (MMIa)").

The calculation formula: $MMIa = \alpha \log_{10}(Amax) + \beta$

Here, Amax is an absolute value of a maximum velocity of a ground motion.

Further, $\alpha$ is 3.66, and $\beta$ is $-1.66$.

Time history changes of the predicted value (MMIap) and the calculated value (MMIa) with respect to time have been simulated on the basis of the seismic waveform data recorded by the K-NET, using the above prediction formula and the calculation formula, and the simulation results have been compared with one another. The comparison results will be explained next.

Figure 3:
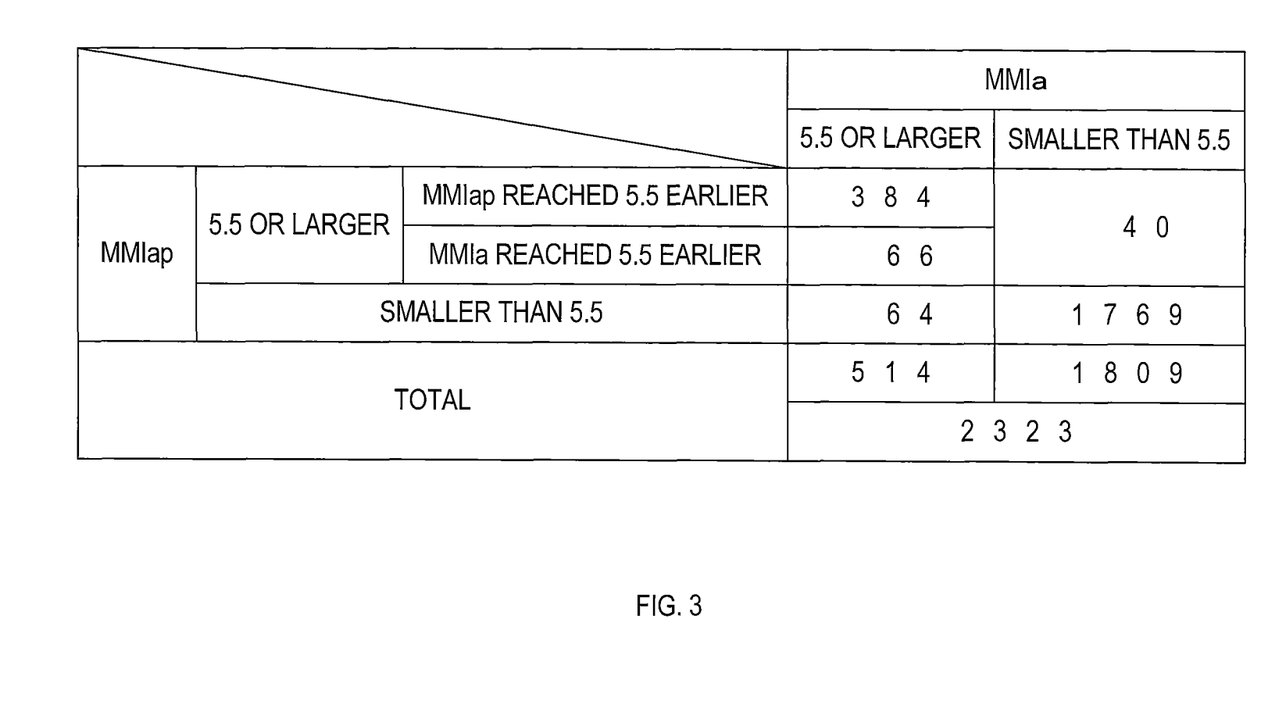
FIG. 3 is a table in which earthquakes that occurred in the past are divided on the basis of whether a calculated value (MMIa) and a predicted value (MMIap) indicating each intensity of earthquake shaking are each at level 5.5, and the divided numbers of the earthquakes are indicated.

As shown in FIG. 3, among the 2323 cases of the seismic waveform data that have been considered here, the number of cases in which both the predicted value (MMIap) and the calculated value (MMIa) indicate level 5.5 or larger by the index value on the MMI scale is 450.

Among these, the number of cases in which the predicted value (MMIap) reached level 5.5 by the index value on the MMI scale earlier than the calculated value (MMIa) in the above simulation is 384, and in contrast, the number of cases in which the calculated value (MMIa) reached level 5.5 earlier is 66.

Figure 4:
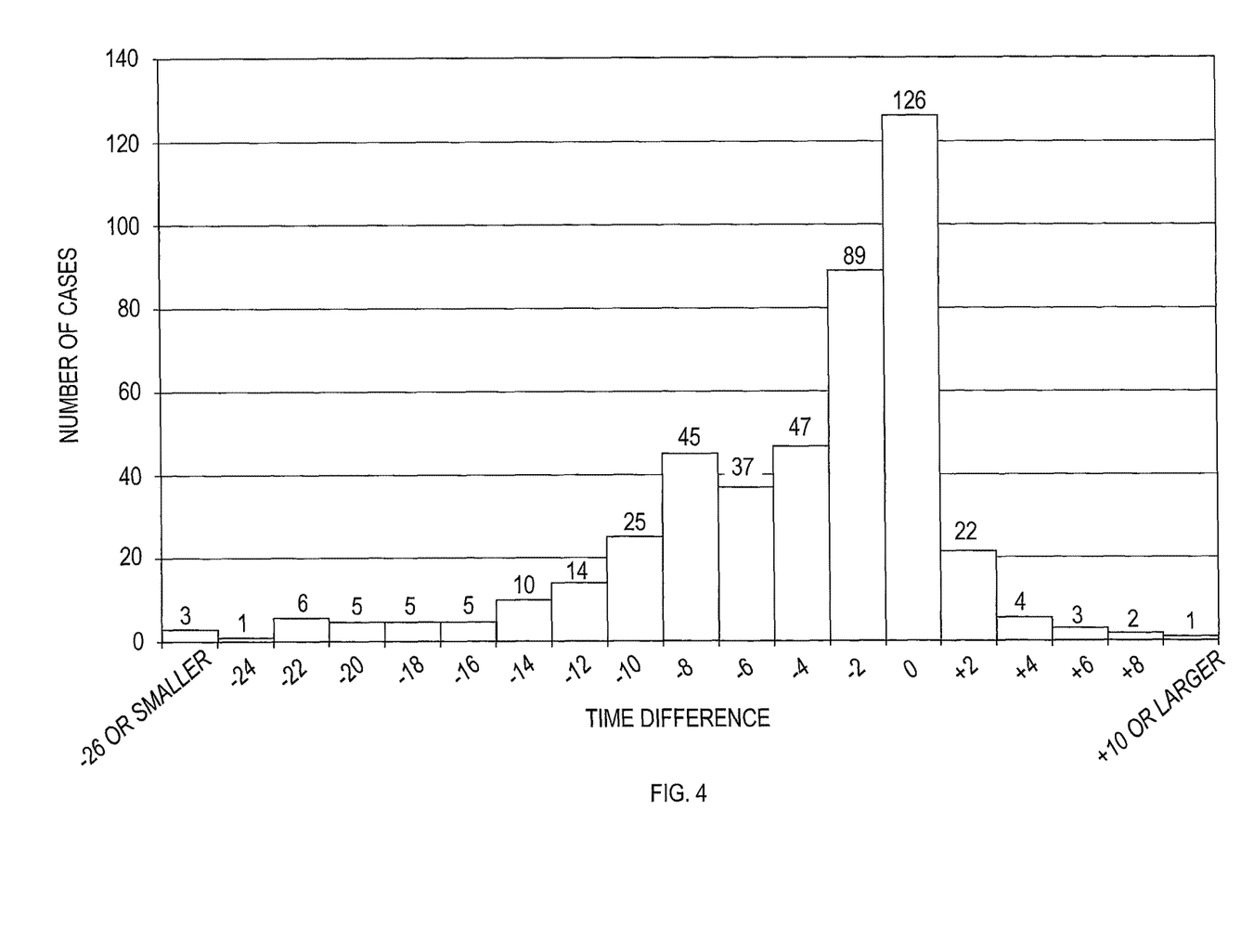
FIG. 4 is a bar graph in which earthquakes that occurred in the past indicating level 5.5 or larger both in the calculated value (MMIa) and the predicted value (MMIap) are divided on the basis of a difference between a timing when the predicted value (MMIap) reached level 5.5 and a timing when the calculated value (MMIa) reached level 5.5, and the divided numbers of the earthquakes are indicated.

Upon further consideration of the seismic waveform data of the above 384 cases, as shown in FIG. 4, it has been found that the number of the seismic waveform data in which the predicted value (MMIap) reached level 5.5 by the index value on the MMI scale earlier than the calculated value (MMIa) by a range not less than 0 second and less than 2 seconds is 126, and the like.

It has also been found that, on average, the predicted value (MMIap) reached level 5.5 on the Modified Mercalli Intensity scale about 5.4 seconds earlier than the calculated value (MMIa).

That is, the earthquake prediction device 1 of the present embodiment can predict early, at the time of initial tremor of the ground motion, whether a destructive shaking that requires warning will arrive, using the MMI scale as a ground motion index.

3. Earthquake Warning Process

Figure 5:
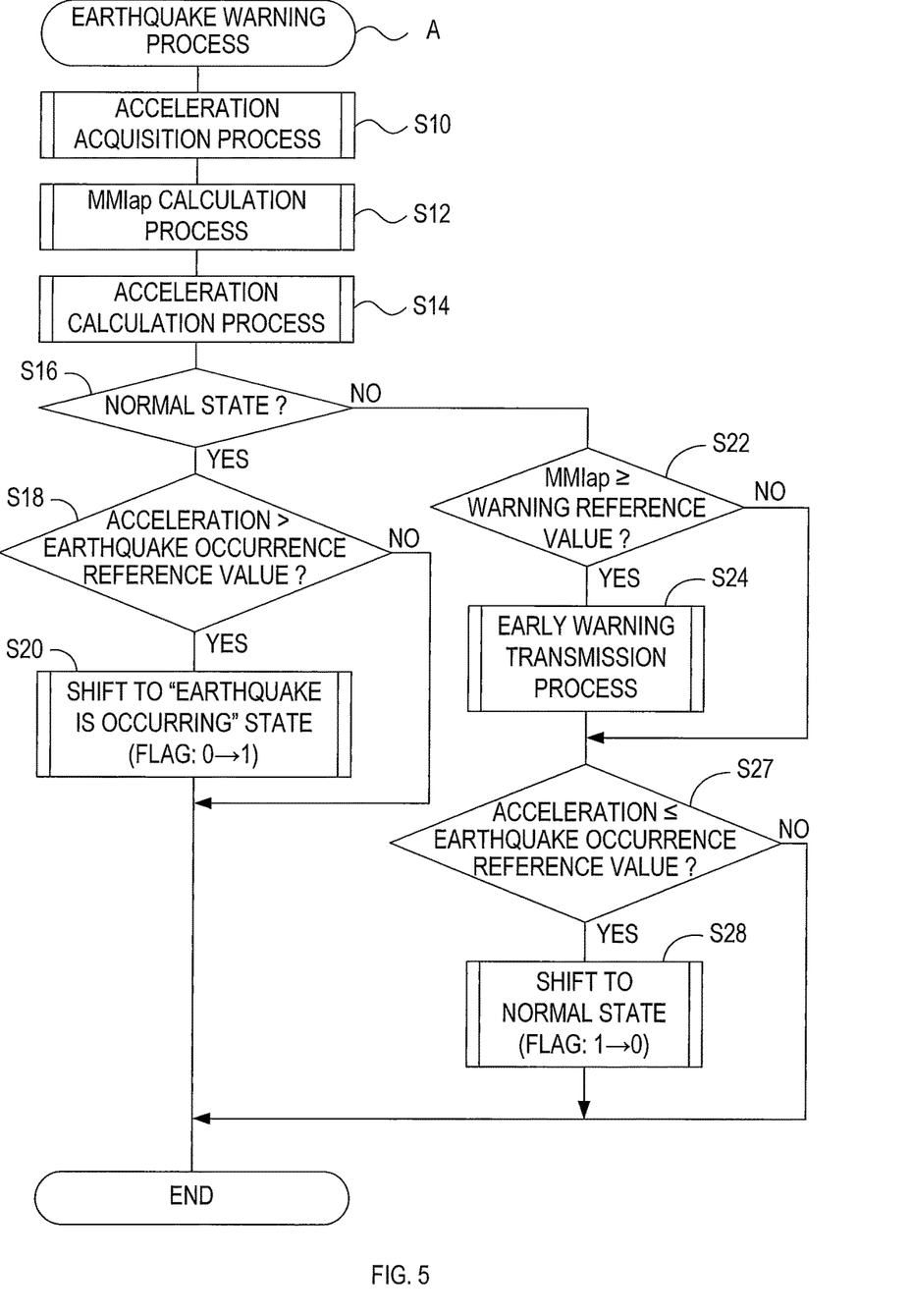
FIG. 5 is a flowchart of an earthquake warning process executed by the earthquake prediction device of the first embodiment.

Next, an explanation will be given of the earthquake warning process A executed by the earthquake prediction device 1 of the present embodiment with reference to FIG. 5.

The earthquake warning process A of the present embodiment is started when a not-shown power switch of the earthquake prediction device 1 is turned on, and is subsequently executed repeatedly until the power switch is turned off in each sampling period.

In the earthquake warning process A, an acceleration acquisition process of S10 is first executed.

In this S10, the acceleration acquisition unit 10 executes a process for inputting the analog signals indicating the acceleration components of the ground motion in the three directions (east-west, north-south, vertical) inputted from the acceleration sensor device 3 and for sampling the inputted analog signals.

Then, in this S10, a process is executed in which the digital signal indicating the sampled vertical acceleration component of the ground motion is outputted to the acceleration recording unit 14 and the earthquake occurrence determination unit 20, and the digital signals indicating the acceleration component in the east-west direction and the acceleration component in the north-south direction are outputted to the earthquake occurrence determination unit 20. The acceleration recording unit 14 records the vertical acceleration information regarding the vertical acceleration component of the ground motion indicated by the digital signal.

Next, an MMIap calculation process of S12 is executed.

In this S12, the predicted value calculation unit 16 executes a process for calculating the predicted value (MMIap) using the maximum acceleration value (Aumax), which is the maximum absolute value among the absolute values of the vertical acceleration component in the vertical acceleration information recorded by the acceleration recording unit 14.

Next, in S14, the earthquake occurrence determination unit 20 executes a process for calculating an acceleration of the ground motion at the observation point from the acceleration components of the ground motion in the three directions converted into the digital signals by the acceleration acquisition unit 10.

Next, a process of S16 is executed.

In this S16, a process is executed in which whether an earthquake is occurring is determined.

In this S16, the first warning unit 18 executes a process for, specifically, determining whether the flag stored in the flag storage region 20*a* is "1" indicating that an earthquake is occurring or "0" indicating a normal state in which no earthquake is occurring.

In this S16, if the flag is determined to be "0", i.e., "normal state", (S16: YES), a process of S18 is executed next. If the flag is determined to be "1", i.e., "earthquake is occurring" (S16: NO), a process of S22 is executed next.

In S18, a process for determining whether the absolute value of the acceleration of the ground motion at the observation point is larger than the above-described earthquake occurrence reference value is executed.

This S18 is executed by the earthquake occurrence determination unit 20.

In this S18, if the absolute value of the acceleration of the ground motion is larger than the earthquake occurrence reference value, i.e., if an earthquake is occurring (S18: YES), a process for changing the flag stored in the flag storage region 20*a* from "0" to "1" is executed (S20). Then, the present earthquake warning process A ends, and the processes of and after S10 are executed again.

In contrast, if the absolute value of the acceleration of the ground motion is smaller than the earthquake occurrence reference value, i.e., if no earthquake is occurring (S18: NO), the present earthquake warning process A ends immediately, and the processes of and after S10 are executed again.

Next, an explanation will be given of a process of S22 executed when it is determined in S16 that the flag is "1", i.e., "earthquake is occurring" (S16: NO).

In this S22, the first warning unit 18 executes a process for determining whether the predicted value (MMIap) calculated in S12 is equal to or larger than the warning reference value, which is a standard for warning, i.e., whether the predicted value (MMIap) is at level 5.5 or larger on the MMI scale.

If it is determined in this S22 that the predicted value (MMIap) is larger than the warning reference value, it is found that, as described above, it is 5.4 seconds on average before occurrence of the shaking of level 5.5 or larger on the MMI scale at the observation point where the earthquake prediction device 1 is placed.

Thus, if it is determined in S22 that the predicted value (MMIap) is at level 5.5 or larger on the MMI scale (S22: YES), a process of S24 is executed next, where a process for transmitting the warning signal from the first warning unit 18 to the external warning device 5 is executed. Then, after this S24, a process of S27 is executed.

In contrast, if it is determined in S22 that the predicted value (MMIap) is at level smaller than 5.5 on the MMI scale (S22: NO), a process of S27 is executed next.

In S27, contrary to S18, a process for determining whether the value of the acceleration of the ground motion at the observation point is smaller than the earthquake occurrence reference value set in advance is executed.

This S27 is executed by the earthquake occurrence determination unit 20. In this S27, similarly to S18, a process for determining whether the absolute value of the acceleration of the ground motion at the observation point is equal to or smaller than the above-described earthquake occurrence reference value is executed.

In this S27, if the absolute value of the acceleration of the ground motion is equal to or smaller than the reference value (S27: YES), a process for changing the flag stored in the flag storage region 20*a* from "1" to "0" is executed (S28). Then, the present earthquake warning process A ends, and the processes of and after S10 are executed again.

In contrast, if the value of the acceleration of the ground motion is larger than the reference value (S27: NO), the present earthquake warning process A ends immediately, and the processes of and after S10 are executed again.

4. Characteristic Effects of Earthquake Prediction Device of Present Embodiment

As described above, when the predicted value (MMIap) of the ground motion of the earthquake that occurred in the past and the calculated value (MMIa) are compared with each other, it has been found that the predicted value (MMIap) reached the warning reference value 5.4 seconds earlier than the calculated value (MMIa) at the time of initial tremor of the ground motion.

Consequently, with the earthquake prediction device 1 of the present embodiment, it is possible to predict occurrence of an earthquake that requires warning early at the time of initial tremor of the ground motion using the MMI scale as the ground motion index.

Such an early prediction of occurrence of an earthquake that requires warning enables a braking to be performed 5.4 seconds prior to a severe shaking in a case of a rapid-transit railway with a travel speed of 270 km/h, for example. Thus, with the earthquake prediction device 1 of the present embodiment, the train can be stopped 375 m shorter than in the case where the braking is performed when the severe shaking occurs.

Besides, when an earthquake that requires warning is predicted by the earthquake prediction device 1 of the present embodiment, actions may be taken, such as stopping an elevator at the nearest floor, stopping a machine vulnerable to shaking, delivering a message to people via a speaker or TV.

Moreover, in the earthquake prediction device 1 of the present embodiment, occurrence of an earthquake that requires warning is predicted early using the MMI scale, and thus, prediction of an earthquake that is easy to understand globally is possible.

Furthermore, in the earthquake prediction device 1 of the present embodiment, a warning is issued only when the predicted value (MMIap) is larger than the earthquake occurrence reference value set in advance (S22→S24), and thus, a useless warning issued when an earthquake that does not require a warning is occurring can be inhibited.

Second Embodiment

Next, a second embodiment of the present invention will be explained.

In the present embodiment, only differences from the first embodiment will be explained. It is to be noted that the second embodiment is referred to as the present embodiment in the sections below in which the second embodiment is explained.

1. Earthquake Prediction Device 1

Figure 6:
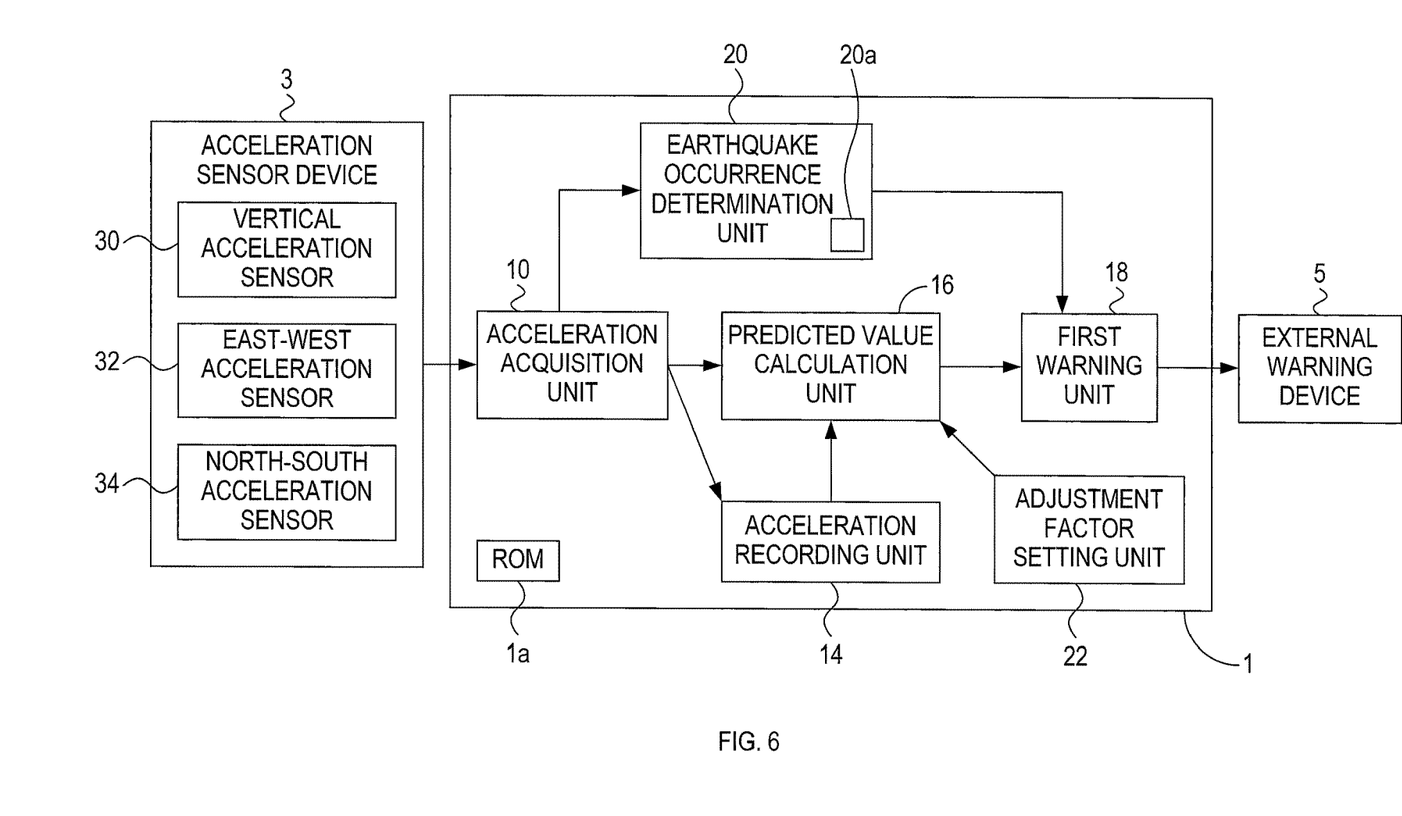
FIG. 6 is a block diagram showing, with blocks, various functions of an earthquake prediction device of a second embodiment.

As shown in FIG. 6, the earthquake prediction device 1 of the present embodiment is different from the earthquake prediction device 1 of the first embodiment in that an adjustment factor setting unit 22 is provided.

In addition, the present embodiment is different from the first embodiment in that an adjustment value γa is added to the prediction formula for calculation of the predicted value (MMIap) to be used by the predicted value calculation unit 16.

The prediction formula: MMIap=αa $\log_{10}$(Aumax)+ βa+γa

In the present embodiment, γa can be adjusted between −1 and 1. As the adjustment factor setting unit 22, a turn-style adjustment knob is used, for example, with which a value of γa can be adjusted by a manual operation, i.e., by varying a turning amount, etc., of the knob.

The predicted value calculation unit 16 calculates the predicted value (MMIap) using a value set as the adjustment value γa set by the adjustment factor setting unit 22 and using the prediction formula including such γa.

It is to be noted that the predicted value (MMIap) is calculated using the above prediction formula including the above-described γa in S22 too, in the earthquake warning process A executed by the earthquake prediction device 1 of the present embodiment.

2. Regarding Adjustment Value γa

Next, a warning success rate and a cry-wolf false warning rate will be explained with reference to FIG. 7.

The warning success rate and the cry-wolf false warning rate are calculated using the data of the ground motions of the earthquakes recorded by the K-NET.

The warning success rate is a rate of the earthquakes whose predicted value (MMIap) is 5.5 or larger among all the earthquakes whose calculated value (MMIa) is 5.5 or larger.

The cry-wolf false warning rate is a rate of the earthquakes whose calculated value (MMIa) is smaller than 5.5 among all the earthquakes whose predicted value (MMIap) is 5.5 or larger.

As shown in FIG. 7, the warning success rate is higher as γa is closer to 1, and is approximately 100% when γa is set at 1. In contrast, the warning success rate is lower as γa is closer to −1, and is approximately 40% when γa is set at −1.

On the other hand, the cry-wolf false warning rate is lower as γa is closer to −1, and is approximately 0% when γa is set at −1. In contrast, the cry-wolf false warning rate is higher as γa is close to 1, and is approximately 40% when γa is set at 1.

3. Characteristic Effects of Earthquake Prediction Device of Present Embodiment

The earthquake prediction device 1 of the present embodiment produces effects below in addition to the effects produced by the earthquake prediction device 1 of the first embodiment.

When occurrence of an earthquake is predicted early and a warning thereabout is issued using the earthquake prediction device 1 of the present embodiment, following two demands from users are expected, for example.

One demand expected is that a warning be issued in every case when occurrence of an earthquake that requires caution is predicted even if there are some cases in which the prediction turns out to be incorrect, regardless of whether the earthquake that requires caution is actually occurring. In this case, increase in the warning success rate is desired.

The other demand expected is that a warning not be issued when an earthquake that requires caution is not occurring even if there are some cases in which no warning is issued when an earthquake that requires caution is occurring. In this case, decrease in the cry-wolf false warning rate is desired.

Thus, in the earthquake prediction device 1 of the present embodiment, the predicted value (MMIap) to be calculated is adjusted by adding γa in the prediction formula, and the above two demands can thereby be met.

For example, when the warning reference value is set at level 5.5 on the MMI scale and γa is set at −1, the cry-wolf false warning rate is closer to 0%, and in contrast, when γa is set at 1, the warning success rate is closer to 100%, as shown in FIG. 7.

That is, when γa is set at 1, if occurrence of an earthquake that requires caution is predicted, a warning is issued without exception regardless of whether the earthquake that requires caution is actually occurring.

On the other hand, when γa is set at −1, there are some cases in which no warning is issued when an earthquake that requires caution is occurring, whereas no case arises in which a warning is issued when an earthquake that requires caution is not occurring.

Consequently, the earthquake prediction device 1 of the present embodiment enables a prediction that meets the users' demands.

Correspondence Relationships

The process executed by the acceleration acquisition unit 10 in the process of S10 in the above embodiment corresponds to one example of a vertical acceleration acquisition unit set forth in the claims.

The process executed by the predicted value calculation unit 16 in the process of S14 in the above embodiment corresponds to one example of a predicted value calculation unit set forth in the claims.

The processes in which the first warning unit 18 transmits the warning signal to the external warning device 5 in the processes of S22 to S24 in the above embodiment correspond to one example of a process in which a warning unit issues a warning, which is set forth in the claims.

Other Embodiments

In the above embodiments, the acceleration sensor device 3 has been explained as being a device separate from the earthquake prediction device 1. However, the acceleration sensor device 3 may be incorporated into the earthquake prediction device 1.

In the above embodiments, the external warning device 5 has been explained as a device that can communicate with the earthquake prediction device 1 via public lines. However, the external warning device 5 may be a warning device that is provided to the earthquake prediction device 1 and emits a warning sound.

Figure 8:
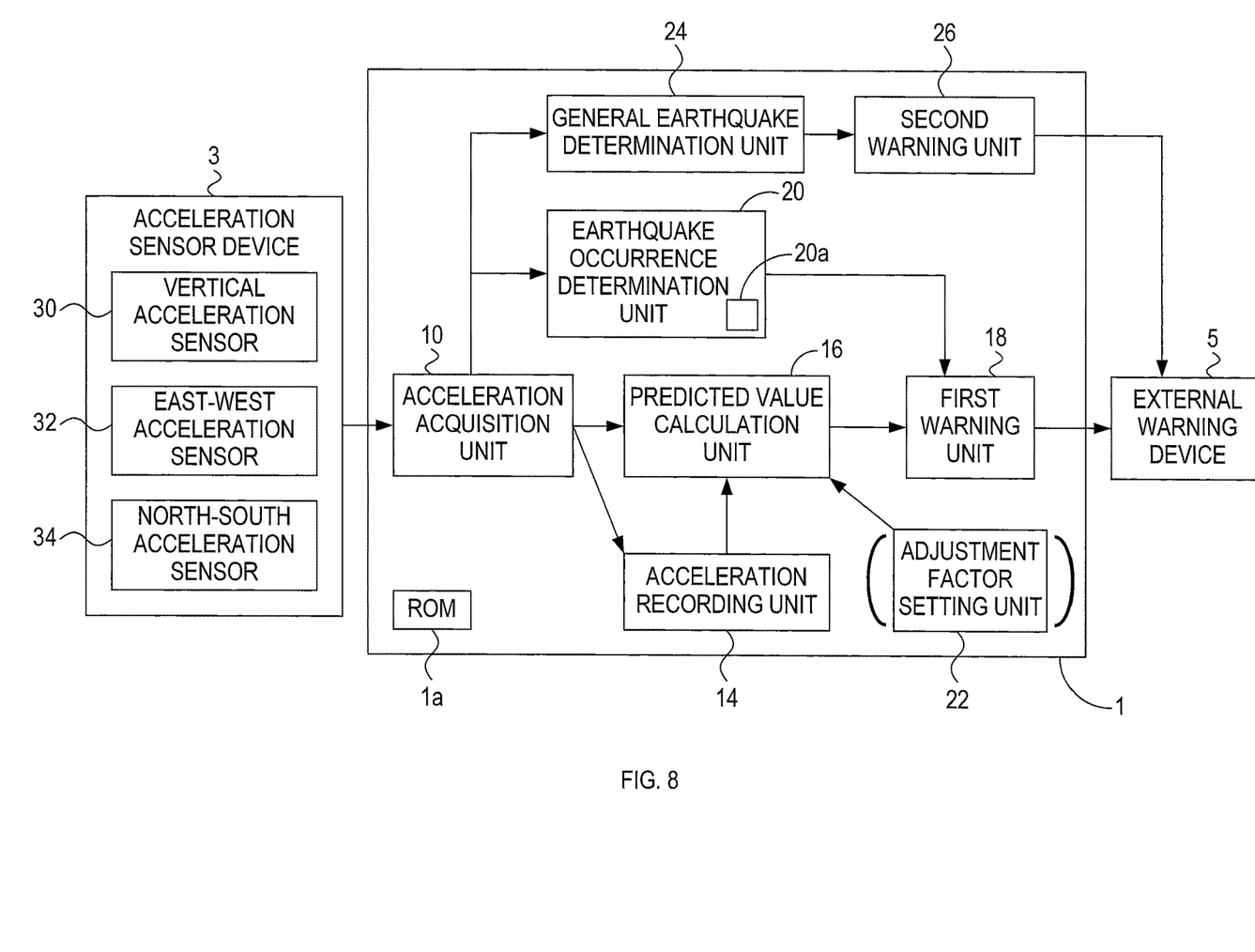
FIG. 8 is a block diagram showing, with blocks, various functions of an earthquake prediction device of another embodiment.

Further, as shown in FIG. 8, the earthquake prediction device 1 may be designed to comprise a general earthquake determination unit 24 that determines an earthquake by a conventional determination method and a second warning unit 26 that issues a warning based on such a determination.

In this case, the second warning unit 26 executes a process for issuing a warning to the external warning device 5 when the general earthquake determination unit 24 determines that an earthquake is occurring.

Thus, in the earthquake prediction device 1 of the present embodiment, the external warning device 5 issues a warning when occurrence of an earthquake is determined by either the first warning unit 18 or the second warning unit 26.

In this case, the adjustment factor setting unit 22 may be or may not be provided.

Figure 9:
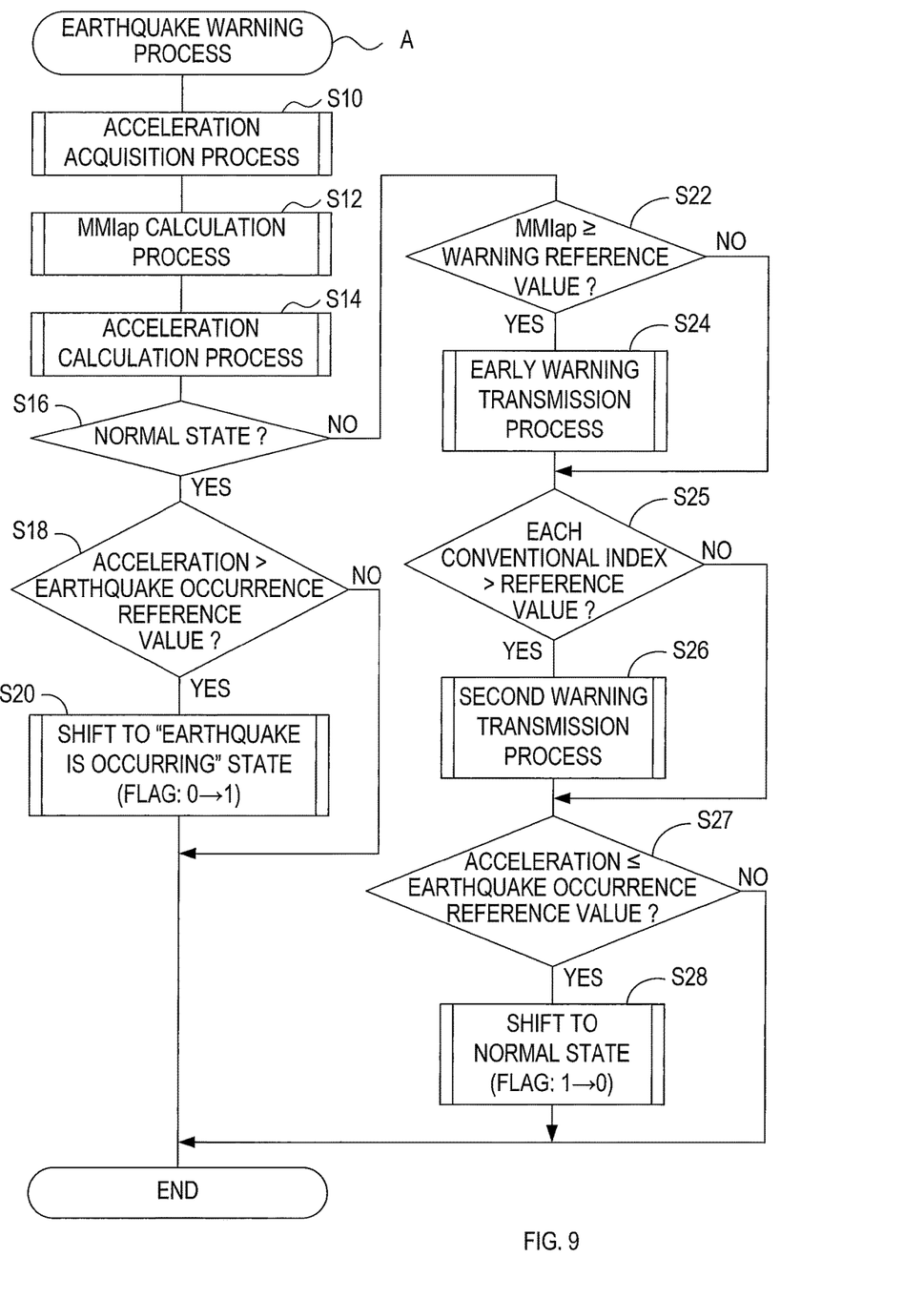
FIG. 9 is a flowchart of an earthquake warning process executed by the earthquake prediction device of the another embodiment.

When the general earthquake determination unit 24 and the second warning unit 26 are provided, processes of S25 and S26 may be executed between the processes of S24 and S27, as shown in FIG. 9.

In this case, in S25, it is determined whether an earthquake is occurring by a conventional method. If it is determined that an earthquake is occurring (S25: YES), a process for issuing a second warning, which is different from the early warning of the above embodiment, is executed in S26.

The functions 10 to 260 of the respective units constituting the earthquake prediction device 1 of the present embodiment can be fulfilled by a computer to which the acceleration sensor device 3 and the external warning device 5 are connected by using a program stored in the ROM 1a. This program may be used by being loaded to the computer from the ROM 1a or a backup RAM, or may be used by being loaded to the computer via a network.

Alternatively, this program may be used by being recorded on a recording medium of any forms readable by the computer. Such a recording medium includes, for example, a portable semiconductor memory (e.g., a USB memory, a memory card (registered trademark), etc.).

The present invention is only required to be consistent with the gist of the invention set forth in the claims, and is not limited to the above embodiments.

The invention claimed is:

1. An earthquake prediction device comprising:
a sensor configured to detect a ground motion;
a vertical acceleration acquisition unit that sequentially acquires vertical acceleration information indicating a vertical acceleration component of the ground motion from the sensor, when the sensor starts detecting the ground motion;
a predicted value calculation unit that calculates a predicted value (MMIap) indicating an intensity of earthquake shaking by an index value on the Modified Mercalli Intensity scale, using a maximum absolute value among absolute values of a vertical acceleration component of the ground motion indicated by the vertical acceleration information sequentially acquired by the vertical acceleration acquisition unit as a maximum acceleration value (Aumax), using a prediction formula below:
the prediction formula: $MMIap = \alpha a \log_{10}(Aumax) + \beta a + \gamma a$, wherein $\alpha a$ and $\beta a$ are regression coefficients calculated in advance by regression analysis, and $\gamma a$ is an adjustment factor adjustable between −1 and 1;
a turn-style adjustment knob configured to be adjusted by a manual operation by a user; and
an adjustment factor setting unit that sets the adjustment factor ($\gamma a$) in the prediction formula, based on the manual operation of the adjustment knob, in which the regression coefficients $\alpha a$ and $\beta a$ are calculated in advance.

2. The earthquake prediction device according to claim 1, further comprising a warning unit that compares the predicted value (MMIap) calculated by the predicted value calculation unit and a warning reference value set in advance with each other, and issues a warning when the predicted value (MMIap) is larger than the warning reference value.

3. The earthquake prediction device according to claim 2, further comprising an earthquake occurrence determination unit that determines occurrence of an earthquake by presence/absence of the ground motion,
wherein the warning unit issues the warning when the earthquake occurrence determination unit determines that the earthquake is occurring.

* * * * *